United States Patent [19]
Horton

[11] Patent Number: 5,805,203
[45] Date of Patent: Sep. 8, 1998

[54] TIME DIVISION, MULTIPLEXED, SHARED BANDWIDTH COMMUNICATION SYSTEM

[75] Inventor: James A. Horton, Emmaus, Pa.

[73] Assignee: JSM Co., Inc., Butler, Pa.

[21] Appl. No.: 651,701

[22] Filed: May 21, 1996

[51] Int. Cl.$^6$ .................................................. H04N 7/173
[52] U.S. Cl. ................................. 348/12; 348/7; 348/13; 370/458
[58] Field of Search .................................. 348/7, 12, 13; 455/5.1, 4.2; 370/458, 442, 443, 522, 459, 345, 347, 486, 489; H04N 7/173

[56] References Cited

U.S. PATENT DOCUMENTS

| | | | |
|---|---|---|---|
| 3,919,484 | 11/1975 | Maxemchuk | 370/458 |
| 4,413,338 | 11/1983 | Renoulin et al. | 370/458 |
| 4,549,291 | 10/1985 | Renoulin et al. | 370/458 |
| 4,750,171 | 6/1988 | Kedar et al. | 370/458 |
| 4,771,425 | 9/1988 | Baran et al. | 370/458 |
| 4,811,407 | 3/1989 | Blokker, Jr. et al. | 382/1 |
| 4,827,474 | 5/1989 | Le Goffic et al. | 370/442 |
| 4,843,606 | 6/1989 | Bux et al. | 370/458 |
| 4,862,268 | 8/1989 | Campbell et al. | 358/141 |
| 4,894,789 | 1/1990 | Yee | 455/5 |
| 5,347,304 | 9/1994 | Moura et al. | 348/12 |
| 5,355,162 | 10/1994 | Yazolino et al. | 348/11 |
| 5,359,367 | 10/1994 | Stockill | 348/552 |
| 5,488,412 | 1/1996 | Majeti et al. | 348/10 |
| 5,546,400 | 8/1996 | Hironaka | 370/458 |
| 5,613,190 | 3/1997 | Hylton | 348/12 |
| 5,630,204 | 5/1997 | Hylton et al. | 348/7 |
| 5,677,905 | 10/1997 | Bigham et al. | 455/4.2 |
| 5,682,325 | 10/1997 | Lightfoot et al. | 348/12 |
| 5,696,765 | 12/1997 | Safadi | 348/12 |

*Primary Examiner*—Tommy P. Chin
*Assistant Examiner*—Luanne P. Din
*Attorney, Agent, or Firm*—Kirkpatrick & Lockhart LLP

[57] ABSTRACT

A time division, multiplexed, shared bandwidth, high speed data system for use over CATV and broadcast equipment, which allows transmission rates to be adjusted on a per receiver basis in both forward (downstream) and return (upstream) directions, utilizes a time division multiplexed method to transmit information from a service provider to a plurality of users (downstream) using the equivalent of horizontal sync pulses to define the start and end of a period of transmission assigned to a specific user. The transmission is grouped into frames which typically contain five hundred to several thousand transmission periods. In each frame, at least one transmission period is reserved for each actively connected user which is used as a connection control channel. The remaining transmission periods are shared by all users and are dynamically allocated to transfer data. Hence, each user is allocated a small fixed bandwidth control channel and is provided with additional shared bandwidth for data transfers as needed. Transmission from the user to the service provider (upstream) is also time division multiplexed. Each user is allocated a period of time relative to the occurrence of the start of a frame, adjusted for the round trip propagation delay between the service provider and user, which is used as an upstream control channel which can be used to request additional shared upstream bandwidth for data transfers as needed.

17 Claims, 8 Drawing Sheets

TIME DIVISION, MULTIPLEXED, SHARED BANDWIDTH COMMUNICATION SYSTEM

BACKGROUND OF THE INVENTION

1. Field of the Invention

The present invention is directed generally to communication systems and, more particularly, to communication systems suitable for transmitting high speed data, telephony, and video information to broadcast and CATV users.

2. Description of the Background

Among the obstacles which must be overcome in providing high speed digital services to broadcast and CATV users, are varying reception quality amongst the user base, adaptability to combination CATV systems in which the cable plant is a mixture of uni-directional and bi-directional cable, a noisy cable return channel spectrum (generally <42 MHz), varying length from user to bi-directional node or cable plant head end, and controlling the usage of shared bandwidth, both upstream and downstream, amongst multiple users.

Currently available bi-directional cable modems utilize a CSMA/CD method whereby a particular user wishing to transmit upstream via cable waits for a quiet in the downstream transmission, then begins transmitting on the upstream path. The upstream signal is echoed by equipment at the cable head-end into the downstream path. The user listens to the downstream path for a collision, and encountering one backs off for a random period of time then re-attempts. This approach has numerous problems when utilized in a typical cable plant. It consumes part of the downstream bandwidth to echo upstream transmissions as a part of collision detection. Potentially long propagation delays, usually six microseconds per mile, between the user and head-end, and substantial delay variations between users greatly complicate collision detection systems, forcing longer packet headers and favoring users closer to the head-end.

Current systems also operate at a fixed transmission rate for all users. In addressed packet transmission systems, the signal must be received and interpreted to identify its destination. Because the source and/or destination of the transmission is unknown until the packet is interpreted, this implies that the receiver must be able to either identify a lower transmission rate during reception, or be able to simultaneously receive and decode all transmission rates. Using a higher fixed rate requires either insuring the reception quality throughout the cable plant, or selecting a lower transmission rate which accommodates the worst case.

SUMMARY OF THE INVENTION

Herein described is a time division multiplexed, shared bandwidth, high speed data system for use over CATV and broadcast equipment, which allows transmission rates to be adjustable on a per receiver basis in both forward (downstream) and return (upstream) directions.

The system utilizes a time division multiplexed method to transmit information from a service provider to a plurality of users (downstream), which has elements similar to that of conventional color television broadcast. This allows the use of standard television components in the customer equipment, substantially reducing the cost of the customer equipment. In this system the equivalent of horizontal sync pulses are used to define the start and end of a period of transmission assigned to a specific user. The transmission is grouped into frames which typically contain five hundred to several thousand transmission periods. In each frame, at least one transmission period is reserved for each actively connected user which is used as a connection control channel. The remaining transmission periods are shared by all users and are dynamically allocated to transfer data. Hence, each user is allocated a small fixed bandwidth control channel and is provided with additional shared bandwidth for data transfers as needed.

Transmission from the user to the service provider (upstream) is also time division multiplexed. Each user is allocated a period of time relative to the occurrence of the start of a frame, adjusted for the round trip propagation delay between the service provider and user, which is used as an upstream control channel. Just as in the downstream transmission, each user is allocated a small fixed bandwidth upstream control channel, and requests additional shared upstream bandwidth for data transfers as needed.

By assigning exclusive transmission periods to each user, the system may optimize the transmission method and increase noise immunity for each individual user to overcome reception problems which would otherwise result in a complete failure to receive or significant retries. This applies to both downstream and upstream transmissions. System throughput is maximized because of: 1) the collision free method—users do not randomly compete for upstream transmission time nor is downstream bandwidth consumed by collision detection, 2) transmission methods are individually adjustable in both the upstream and downstream directions without affecting other users.

The downstream control channel is used to transmit connection control messages to the user which specify additional time periods containing data transfers and to change the data encoding format to overcome noise in either the downstream or upstream paths.

The upstream control channel is used by the user to request a change in the downstream encoding format to overcome noise or to request additional upstream bandwidth for data transmissions from the user to the service node.

The downstream and upstream transmission control periods are assigned to the user during the establishment of a connection.

Because the downstream and upstream transmission periods are exclusive to an individual user, the system has the opportunity to optimize the transmission method for each user by, for example, varying the transfer rate and corresponding sensitivity to noise. This allows users with a high quality signal to receive data at a maximum rate, while reducing the data rate only to users with a lower quality signal.

In systems where an upstream transmission path is not available, a conventional telephone modem may be utilized in its place. Those advantages and benefits of the present invention, and others, will become apparent from the Description of the Preferred Embodiments hereinbelow.

BRIEF DESCRIPTION OF THE DRAWINGS

For the present invention to be clearly understood and readily practiced, the present invention will be described in conjunction with the following figures wherein.

DESCRIPTION OF THE PREFERRED EMBODIMENTS

Introduction

The system of the present invention provides a high speed digital service to users via CATV or broadcast, optionally using a telephone modem return path. Data is transmitted to and received from a plurality of users within discrete periods of time division multiplexed frames. There are two unique data channels provided to each user, a small fixed bandwidth control channel, and a dynamically allocated, shared bandwidth data channel. Each channel has an individually adjustable transmission method which is used to overcome noise. The control channel is used to manage the connection between the user and the service node including allocating bandwidth for the data channel and changing the transmission method. The data channel is used to relay information requests and responses between a user and information service provider.

System Block Diagram

Figure 1:
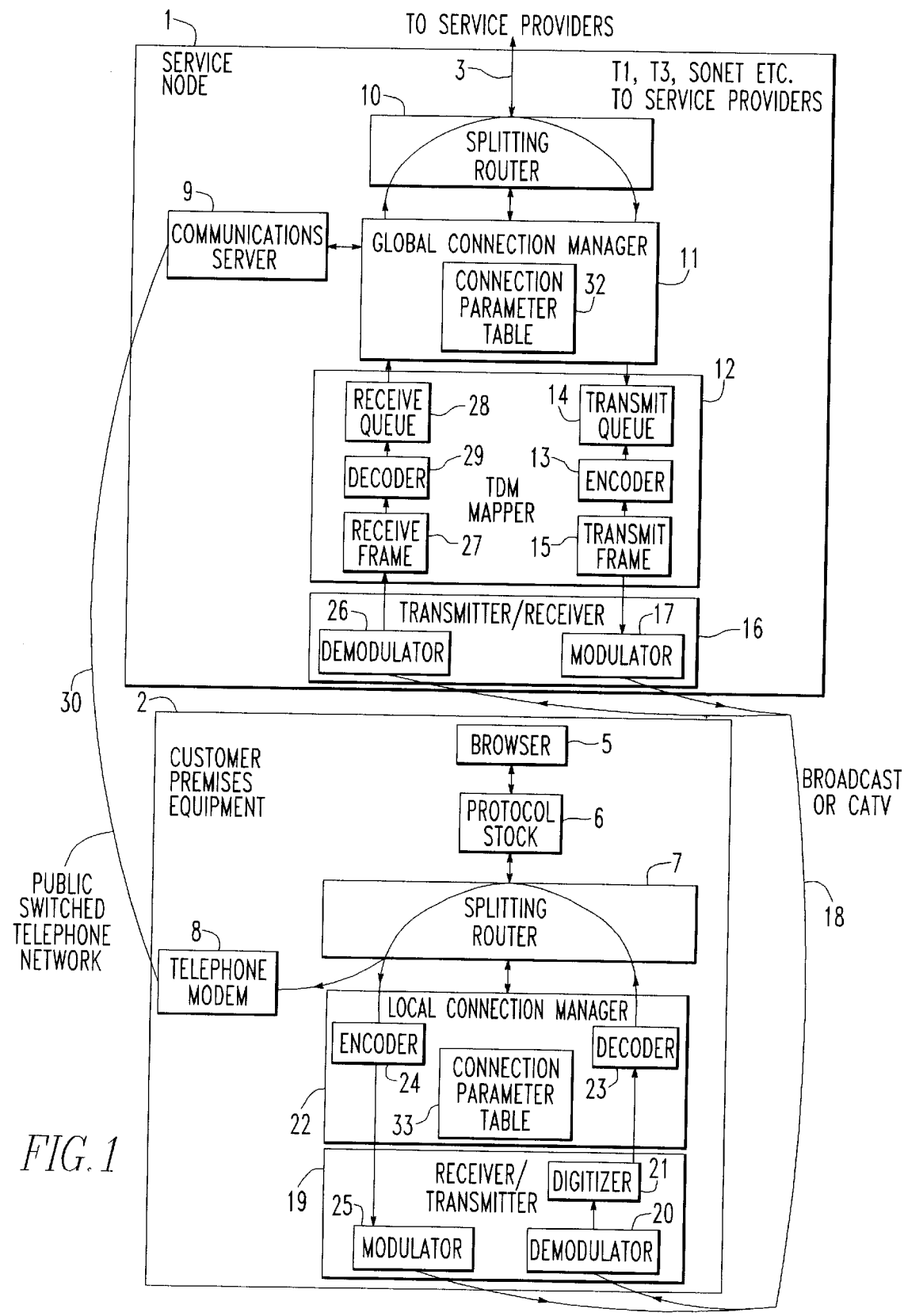
FIG. 1 is a block diagram illustrating a communication system constructed according to the teachings of the present invention.

Referring to FIG. 1, a system constructed according to the teachings of the present invention consists of a service node 1 connected via broadcast or CATV distribution means 18 to a plurality of users, each with user being provided with customer premises equipment 2. Users transmit requests to the service node either through a return channel within the distribution means 18, or through the public switched telephone network 30.

The service node 1, relays information requests made by users to service providers such as the Internet, CompuServe or others via a digital link 3, typically a T1, T3 or SONET connection. The service providers respond to the service node 1 with the requested information, which is then relayed via distribution means 18 to the customer premises equipment 2.

Transmissions from the service node 1 to the customer premises equipment 2 are referred to a downstream transmissions, while transmission from the customer premises equipment 2 to the service node 1 are referred to as upstream transmissions. Downstream and upstream transmissions consist of both data and control messages.

The service node 1 is responsible for managing both the downstream and upstream transmissions. In the preferred embodiment, the service node 1 consists of a splitting router 10, a global connection manager 11, a time division multiplexer (TDM) mapper 12 and a transmitter/receiver 16.

The splitting router 10, separates the downstream and upstream data message transmissions. Data messages are those messages exchanged between the user and the service provider. Connection control messages are those messages exchanged between a local connection manager 22 within the customer premises equipment 2, and the global connection manager 11 within the service node 1.

The global connection manager 11 is responsible for controlling the connection between the customer premises equipment 2 and the service node 1 by establishing new connections, allocating a downstream and upstream transmission time for the user to use as a connection control channel and selecting an appropriate transmission method for each user. The global connection manager maintains a connection parameter table 32 containing information concerning each user including the allocated transmit and receive periods and formatting method for upstream and downstream messages.

The TDM mapper 12 is responsible for maintaining a transmit queue 14 of downstream messages for each user, encoding the messages, as shown by block 13, and combining the downstream messages of multiple users into a transmit frame 15. Similarly, a receive frame 27, which contains the encoded upstream messages transmitted from a plurality of users, is separated into individual messages, decoded, as shown by block 29, and placed into a receive queue 28 for the upstream period assigned to the user which transmitted the message.

The transmitter/receiver 16, is responsible for combining the transmit frame 15 with synchronization information using modulator 17, which outputs a signal suitable for RF transmission via the distribution means 18. Service node demodulator 26 extracts the encoded upstream messages from the RF signal received from the distribution means 18 and places them into receive frame 27.

A communications server 9 is utilized as an upstream path when the distribution means 18 has no upstream capability. Under such circumstances, decoder 29, receive queue 28, receive frame 27 and demodulator 26 are not utilized.

The customer premises equipment 2 consists of a user computer with the additional elements shown. A standard browser 5 such as that provided by Netscape serves as the human interface to the system by which requests for information are made of service providers and responses displayed. The browser is connected to a standard network protocol stack 6, typically TCP/IP, which is provided with the user computer operating system.

A splitting router 7 separates the downstream and upstream data message transmissions. As mentioned, data messages are those messages exchanged between the user and the service provider. Connection control messages are those messages exchanged between the local connection manager 22 within the customer premises equipment 2 and the global connection manager 11 within the service node 1.

The local connection manager 22 decodes the downstream transmission received from a receiver/transmitter 19 using a decoder 23 and forwards the decoded messages to the splitting router 7. It encodes upstream messages from the splitting router 7 using an encoder 24 and forwards the encoded messages to the receiver/transmitter 19. The local connection manager maintains a connection parameter table 33 which contains the transmit and receive periods assigned to the user, and the formatting method for upstream and downstream messages.

The receiver/transmitter 19 contains a demodulator 20, digitizer 21 and modulator 25. The demodulator 20 demodulates the downstream transmission and relays the demodulated signal to digitizer 21 as a composite video baseband signal. The digitizer 21 converts the demodulated downstream analog signal into a proportional digital value. The modulator 25 converts the encoded upstream messages into a format suitable for transmission via the distribution means 18.

A telephone modem 8 may be utilized as an upstream path in conjunction with the public switched telephone network 30 and communications server 9 when the distribution means 18 has no upstream capability. Under those conditions, the encoder 24 and modulator 25 are not utilized.

Connection Parameter Table

As mentioned in conjunction with FIG. 1, the global connection manager 11 is responsible for establishing and maintaining a connection between the user and the service node 1, selecting a transmission encoding method, and allocating upstream data transmission time when requested by the user. The global connection manager 11 keeps track of the necessary information by maintaining the connection parameter table 32 which contains information concerning each connection established. An example of one type of connection parameter table 32 is illustrated in table 1.

TABLE 1

Connection Parameter Table

| Connection Number | Connection Type | Network Address | Downstream Control Period | Downstream Data Encoding Factor | Round Trip Delay Time (us) | Upstream Control Period | Upstream Data Encoding Factor |
|---|---|---|---|---|---|---|---|
| 1 | T | 130.27.19.13 | 5 | 4 | N/A | N/A | N/A |
| 2 | C | 130.27.19.18 | 1 | 3 | 87 | 18 | 4 |
| 3 | C | 130.27.19.9 | 15 | 2 | 242 | 52 | 1 |
| 4 | T | 130.27.19.22 | 11 | 1 | N/A | N/A | N/A |
| ... | | | | | | | |
| N | C | 330.27.19.43 | 18 | 2 | 65 | 9 | 3 |

Referring to Table 1, the connection parameter table 32, a unique connection number is assigned to each actively connected user which correlates to an entry within the connection parameter table. Each entry contains a network address, a downstream control period, a downstream data encoding factor, the round trip signal propagation delay time between the service node and the customer premises equipment, an upstream control period and an upstream data encoding factor.

The connection type specifies whether the distribution means supports an upstream path through the distribution means, or uses the public switched telephone network for upstream transmissions.

The network address uniquely identifies the user, and may be statically or dynamically assigned to the connection. It is a standard network address (e.g. IP) used for routing of messages within the service node and between the service node and service providers.

The downstream control period is a single period within each downstream frame exclusively assigned to the connection. Only connection control messages directed to the user represented by the connection will be sent during this period.

The downstream data encoding factor specifies the method by which downstream data messages are to be encoded for and decoded by the local connection manager of the customer premises equipment. A downstream data encoding factor of 1 indicates that the most noise immune method of encoding should be used, higher values indicate successively higher data, less noise immune methods.

The round trip delay time represents the round trip propagation delay between the service node and the customer premises equipment, typically 6 microseconds per mile. This value is determined by the global connection manager during the establishment of a new connection.

The upstream control period is a single period within each upstream frame exclusively assigned to the connection. Only connection control messages transmitted from the user represented by the connection will arrive at the service node during this period.

The upstream data encoding factor specifies the method by which upstream data messages from the user are to be encoded by the local connection manager 22 of the customer premises equipment, and decoded by the TDM mapper 12 in the service node.

In a system where the distribution means 18 does not include an upstream path, for example a system in which the upstream path constitutes the switched telephone network 30, the round trip delay time, upstream control period and upstream data encoding factor are not used.

Downstream Transmission Format

The downstream transmission format consists of two discrete time division multiplexed channels for each user. A fixed bandwidth control channel is used for maintenance of the connection between the user and the service node, and a dynamically allocated data channel is used to exchange information requests and replies between a user and service provider. The control channel is used to notify the user of additional bandwidth allocated to the data channel for the transfer of information requests and replies, and to change the transmission method for the data channel to overcome noise in the distribution means 18.

The downstream transmission consists of a time division multiplexed frame which contains transmissions to multiple users, each at a unique time within the frame. Synchronizing pulses within the transmitted signal mark the start of a frame, and divide the frame into multiple discrete periods, each belonging to a single user. Each connection is allocated a specific period within each frame, the downstream control period, in which messages which manage downstream data transmissions to the user take place. The start of a frame is indicated by a long synchronizing pulse duration, while individual periods within the frame are separated by short synchronizing pulses. Therefore, each connection is allocated a small, regular period of downstream transmission time within each frame, the downstream control period, which is used to manage the user connection.

There are two fundamental message categories, data and connection control. Connection control message are exchanged between the local connection manager of the customer premises equipment and the global connection manager at the service node. Connection control messages are used to manage the operation of the connection. Data messages are information requests and responses exchanged between the browser 5 in the customer premises equipment and the service providers. Connection control messages are sent to the customer premises equipment only during the downstream control period.

Typically there are greater than twice as many periods within a downstream transmitted frame as connections in the connection parameter table. The remaining periods which are not allocated to specific connections as downstream control periods are available for temporary allocation to connections which require bandwidth for the transfer of data messages. When needed, a connection is temporarily allocated one or more of these unallocated periods by the TDM mapper, increasing that connections share of the downstream transmission time within each frame. Any messages sent within the additional allocated periods are encoded with the format indicated in the downstream data encoding factor for the connection. The customer premises equipment is notified of the allocation and de-allocation of these additional periods through a connection control message sent during the connections downstream control period.

A typical downstream transmission frame may have 500 periods, each of which encompasses 50 microseconds. Therefore, the total frame duration is 25 milliseconds (500*50 microseconds). Relating this to Table 1, the connection parameters table, connection 3 is allocated the 50 microsecond time period encompassing 750 microseconds (15*50 microseconds) to 800 microseconds (16*50 microseconds) within the frame.

The customer premises equipment counts the occurrences of the synchronizing pulses in the downstream transmission relative to the start of the downstream frame. Upon encountering the synchronizing pulse count which matches the downstream control period allocated to the connection, the customer premises equipment begins accepting connection control message data until the occurrence of the next synchronizing pulse.

If the connection control message contains an allocation of additional periods to be used for data message transfer, the customer premises equipment accepts data messages during the additional periods indicated in the next transmitted frame. The notification of the granting of additional periods in the downstream frame to transfer data messages to the user precedes the transfer of data messages by one frame. Thus the downstream control period always specifies which additional periods, if any, are to be accepted by the user in the transmission frame which follows.

Upstream Transmission Format

The upstream transmission format is a mirror of the downstream transmission format. Each user is provided with two discrete time division multiplexed upstream channels. A fixed bandwidth control channel is used to reply to connection control messages received by the downstream transmission, requests additional upstream bandwidth in the data channel and to change the downstream transmission format to overcome noise in the distribution means. A dynamically allocated data channel is provided to issue information requests to service providers connected to the service node.

If an upstream transmission path is provided through the distribution means 18, than a corresponding time division multiplexed upstream frame is utilized. Just as in downstream transmissions, the upstream frame is divided into periods. The customer premises equipment for each connection is provided with a time to begin an upstream transmission relative to when it receives the start of the downstream frame, and a duration for which to transmit message data to the service node.

Typically, the upstream and downstream frames have identical duration, number of periods, and period lengths.

Relating this to Table 1, the connection parameter table 32, the customer premises equipment for connection 3 has been allocated the upstream control period 52. Therefore, it must begin transmitting at a time which causes the upstream connection control message it sends to arrive at the service node during period 52 of the receive frame. Period 52 encompasses the time period of 2600 microseconds (52*50 microseconds) to 2650 microseconds (53*50 microseconds). The round trip delay time between the service node and the customer premises equipment must be taken into account. For the upstream transmission to arrive at the service node during the allocated period, the customer premises equipment for connection 3 must begin transmitting 2358 microseconds (2600–242) after it detects the synchronizing pulse for the start of the downstream frame. The customer premises equipment then continues to transmit message data for 50 microseconds, the duration of the upstream control period.

As with the downstream frame, a connection may be temporarily allocated additional periods of the upstream frame transmission time. The customer premises equipment may issue a connection control message to the service node requesting addition upstream transmission periods. The service node replies with a corresponding transmission start time and transmission duration is a subsequent downstream connection control message.

Connection Control Messages

Connection control messages are exchanged between the service node and the user to manage the connection. These messages are used to allocate upstream or downstream bandwidth for the data channels and change the transmission encoding format to overcome noise.

Downstream control messages specify the encoding format for both upstream and downstream transmissions and specify zero or more periods of the next downstream and/or upstream frame to used as a data channel by the user.

The service node transmits a downstream connection control message to each user during each downstream control period for the connection. Likewise, each user transmits an upstream connection control message to the service node during the upstream control period for the connection, or via telephone modem if indicated by the reply requested flag of the downstream connection control message.

TABLE 2

| | Downstream Connection Control Messages | | | | | | | |
|---|---|---|---|---|---|---|---|---|
| Sequence | Reply Requested Flag | Downstream Encoding Factor | Downstream Data Period Start | Downstream Data Period Count | Upstream Encoding Factor | Upstream Data Period Start | Upstream Data Period Duration | Message Checksum |

Referring to Table 2, downstream connection control messages, each downstream connection control message contains the indicated fields. The sequence number is a downstream frame number, incremented for each downstream frame transmitted. The reply requested flag, if true, indicates that the customer premises equipment should reply to the downstream connection control message with an upstream connection control message. The downstream encoding factor is the encoding method which will be used for the downstream data periods indicated in the remainder of the message. The downstream data period start is the starting period number of a sequence of periods in which downstream data messages will be transmitted in the next downstream frame. The downstream data period count is the number of contiguous periods, beginning at the downstream data period start indicated, during which data messages will be transmitted to the user during the next downstream frame. The upstream encoding factor is the encoding method the user is to utilize for encoding upstream data messages to the service node. The upstream data period start is the starting time, relative to the beginning of the next downstream frame when the user may begin transmitting data messages upstream to the service node. The upstream data period duration is the duration which the user has been granted during the next upstream frame to transmit data messages to the service node. The checksum validates the messages contents. Received downstream connection control messages with an invalid checksum are rejected.

TABLE 3

Upstream Connection Control Messages

| Sequence | Requested Downstream Encoding Factor | Upstream Data To Transmit | Message Checksum |
| --- | --- | --- | --- |

Referring to Table 3, upstream connection control messages, each upstream connection control message contains the indicated fields. The sequence is the sequence number corresponding to the last received valid downstream connection control message. The requested downstream encoding factor is the method requested by the customer premises equipment for the formatting of downstream data messages. The upstream data to transmit value contains the total length of data message bytes awaiting transfer to the service node. A checksum is also provided.

Message Encoding

Digital messages are encoded into a sequence of amplitude values. The number of digital bits contained in each amplitude may be varied providing a variable encoding method. Each encoding method has a different susceptibility to noise, which increases with the number of bits encoded into each amplitude.

Each connection has a data encoding factor which dictates the method by which data messages are formatted in the downstream and upstream transmissions. The encoding method used for a transmission is adjusted to accommodate for the received signal quality of the service node or the customer premises equipment.

All message data is encoded into amplitudes values for RF transmission, encoding from 1 to 4 digital bits per amplitude value, the encoding factor. Both the rate at which amplitude values are transmitted, and the maximum and minimum transmitted signal amplitude, are constant. The number of bits per amplitude value is represented by the downstream and upstream data encoding factors within the global connection parameters table 32, as depicted in Table 1. Thus the data encoding factor indicates the number of digital bits contained within each amplitude value.

Message data is encoded by dividing the difference between the maximum and minimum amplitude into 256 equal levels. An encoding factor N, between 1 and 4 is chosen. The first N bits of message data are used as the most significant bits of an 8 bit amplitude value, setting the most significant unused bit of the amplitude value to a 1, and the remaining unused bits of the amplitude value to a zero. The process is repeated using the next N bits of message data until the message data is exhausted, padding the message data with binary zeros if required.

Message Decoding

Each message is decoded using the reverse process by which it was encoded. The encoding method is agreed upon between the service node and user.

The receiver of the encoded data digitizes each of the received amplitude values to a proportional digital value between 0 and 255, representing one of the 256 possible levels between the minimum and maximum received signal level. The original digital message is then reconstructed by using the same encoding factor N which was used by the transmitter of the message. For each received amplitude value, the N most significant bits of the digitized amplitude value are concatenated into the original digital message.

Message Encoding/Decoding Factor and Noise Immunity

The most noise immune method for encoding connection control messages between the service node and user is utilized. The encoding method used for the data channel is adjusted to provide the highest possible data rate which the user is capable of receiving without errors induced by noise in the distribution means.

The number of amplitude values X required to transmit a sequence of Z digital bits is calculated as: $X = Z/N$.

| Example: N=4, Z=12, X=3, x=Don't Care | | | |
| --- | --- | --- | --- |
| Binary Data: | 1010 | 0110 | 0010 |
| Transmitted Amplitude | 10101000 (168) | 01101000 (104) | 00101000 (40) |
| Received Amplitude | 1010xxx | 0110xxxx | 0010xxxx |

| Same Binary Data, N=3, Z=12, X=4, x=Don't Care | | | | |
| --- | --- | --- | --- | --- |
| Binary Data: | 101 | 001 | 100 | 010 |
| Transmitted Amplitude | 10110000 (176) | 00110000 (48) | 10010000 (144) | 01010000 (80) |
| Received Amplitude | 101xxxxx | 001xxxxx | 100xxxxx | 010xxxxx |

Tables 4 through 7 indicate the most common encoding factors and corresponding amplitude values for the possible bit combinations.

TABLE 4

N=1, Required S/N ratio 256/63 = 4.06 = 12.2 dB

| Source Digital Binary Data | Transmitted Amplitude Level (full scale = 255) | Digitized Received Amplitude Value Range | Allowable Received Amplitude Error |
|---|---|---|---|
| 0 | 64 | 0–127 | +63/−64 |
| 1 | 192 | 128–255 | +63/−64 |

TABLE 5

N=2, Required S/N ratio 256/31 = 8.25 = 18.3 dB

| Source Digital Binary Data | Transmitted Amplitude Level (full scale= 255) | Allowable Digitized Amplitude Value Range | Allowable Received Amplitude Error |
|---|---|---|---|
| 00 | 32 | 0–63 | +31/−32 |
| 01 | 96 | 64–127 | +31/−32 |
| 10 | 160 | 128–191 | +31/−32 |
| 11 | 224 | 192–255 | +31/−32 |

TABLE 6

N=3, Required S/N ratio = 256/15 = 17.1 − 24.7 dB

| Source Digital Binary Data | Transmitted Amplitude Level (full scale= 255) | Allowable Digitized Amplitude Value Range | Allowable Received Amplitude Error |
|---|---|---|---|
| 000 | 16 | 0–31 | +15/−16 |
| 001 | 48 | 32–63 | +15/−16 |
| 010 | 80 | 64–95 | +15/−16 |
| 011 | 112 | 96–127 | +15/−16 |
| 100 | 144 | 128–159 | +15/−16 |
| 101 | 176 | 160–191 | +15/−16 |
| 110 | 208 | 192–223 | +15/−16 |
| 111 | 240 | 223–255 | +15/−16 |

TABLE 7

N=4, Required S/N Ratio = 256/7 = 36.6 = 31.3 dB

| Source Digital Binary Data | Transmitted Amplitude Level (full scale=255) | Allowable Digitized Amplitude Value Range | Allowable Received Amplitude Error |
|---|---|---|---|
| 000 | 8 | 0–15 | +7/−8 |
| 0001 | 24 | 16–31 | +7/−8 |
| 0010 | 40 | 32–47 | +7/−8 |
| 0011 | 56 | 48–63 | +7/−8 |
| 0100 | 72 | 64–79 | +7/−8 |
| 0101 | 88 | 80–95 | +7/−8 |
| 0110 | 104 | 96–111 | +7/−8 |
| 0111 | 120 | 112–127 | +7/−8 |
| 1000 | 136 | 128–143 | +7/−8 |
| 1001 | 152 | 144–159 | +7/−8 |
| 1010 | 168 | 160–175 | +7/−8 |
| 1011 | 184 | 176–191 | +7/−8 |
| 1100 | 200 | 192–207 | +7/−8 |
| 1101 | 216 | 208–223 | +7/−8 |
| 1110 | 232 | 224–239 | +7/−8 |
| 1111 | 248 | 240–255 | +7/−8 |

As can be seen in tables 4 through 7, reducing the encoding factor reduces the sensitivity to noise by the receiver. The transfer rate is affected as well, since a lower number of message bits are encoded into each amplitude. With the worst case reduction, from an encoding factor of 4 to an encoding factor of 1, the transfer rate is reduced by a factor of 4 but the immunity to noise is increased by 19.1 dB, an 81 times increase in immunity to noise power. Table 8 summarizes the relationship between transfer rate and allowable signal to noise ratio for the receiver.

TABLE 8

| N | Minimum Required Signal to Noise Ratio for Error Free Reception | Noise Power Ratio, Relative to N=4, Required to Cause Reception Errors | Data Transfer Rate Ratio, Relative to N=4 |
|---|---|---|---|
| 1 | 12.2 dB | 81.2 | 0.25 |
| 2 | 18.3 dB | 20 | 0.50 |
| 3 | 24.7 dB | 4.57 | 0.75 |
| 4 | 31.3 dB | 1 | 1.00 |

The encoding factor is used to adjust the transfer rate and noise immunity on a per connection basis to overcome noise in the distribution means 18. The customer premises equipment may request a different downstream encoding factor by specifying a new requested downstream encoding factor in an upstream connection control message, subject to approval by the global connection manager 11 in the service node. Likewise, the global connection manager 11 in the service node may change either the upstream or downstream encoding factor by setting a new encoding factor in the downstream connection control message.

Connection control messages are sent only during the upstream and downstream control periods, with an encoding factor of 1 to minimize errors. Data messages are transmitted only during allocated data periods of upstream and downstream transmission time using the encoding factor specified in the global connection parameters table.

For systems where the distribution means 18 does not support an upstream channel, upstream connection control messages are sent via telephone modem only when the customer premises equipment is requesting a change in the downstream encoding factor, or an upstream connection control has been signaled in a downstream connection control message.

Connection Establishment (Telephone Upstream)

New connections between users and the service node 1 are established in one of two ways depending on the upstream channel. In general, a user may use the telephone modem 8 to connect to the communications server 9 in the service node 1. The communications server 9 provides the user with a standard network address. The global connection manager 11 allocates a fixed bandwidth downstream connection control channel to the user. The user is provided with the downstream channel frequency and control period via telephone modem 8. The user then sends control and information requests upstream via telephone modem 8, and receives control and information replies via the downstream transmission through the distribution means 18.

More specifically, and with reference to FIG. 1, if the upstream channel uses the telephone network path 30, the user connects to the communications server 9 via the telephone modem 8, optionally performing a login sequence. The communications server 9 allocates and returns a network address to the user, if needed. The local connection manager 22 then creates and transmits a telephone connection request message through the modem 8 and communications server 9 to the global connection manager 11 containing the user network address.

The Global connection manager 11 then creates a connection for a telephone upstream user in the connection parameter table 32 by creating a record in the connection parameters table 32. The global connection manager 11 allocates a currently unused downstream period via the TDM mapper, assigns a network address to the connection, and sets the downstream data encoding factor for the connection to 1. The global connection manager 11 then prepares a telephone connection reply message containing the frequency on which the downstream signal is transmitted and the reserved downstream period for the connection. The global connection manager 11 then transmits the telephone connection reply message through the communications server 9 to the local connection manager 22 for the user. The user then programs the receiver/transmitter 19 with the frequency and downstream transmission period provided.

The browser 5 then issues requests for information to the service provider 3 by sending data request messages through the protocol stack 6, splitting router 7, local connection manager 22, telephone modem 8, communications server 9, global connection manager 11, and splitting router 10. Data responses from the service providers are returned through splitting router 10, global connection manager 11, TDM mapper 13, transmitter/receiver 16, through the distribution means 18 and received by the user receiver 19. The user receiver 19 then relays the received data responses through the local connection manager 22, splitting router 7 and protocol stack 6 to the user browser.

Figure 2:
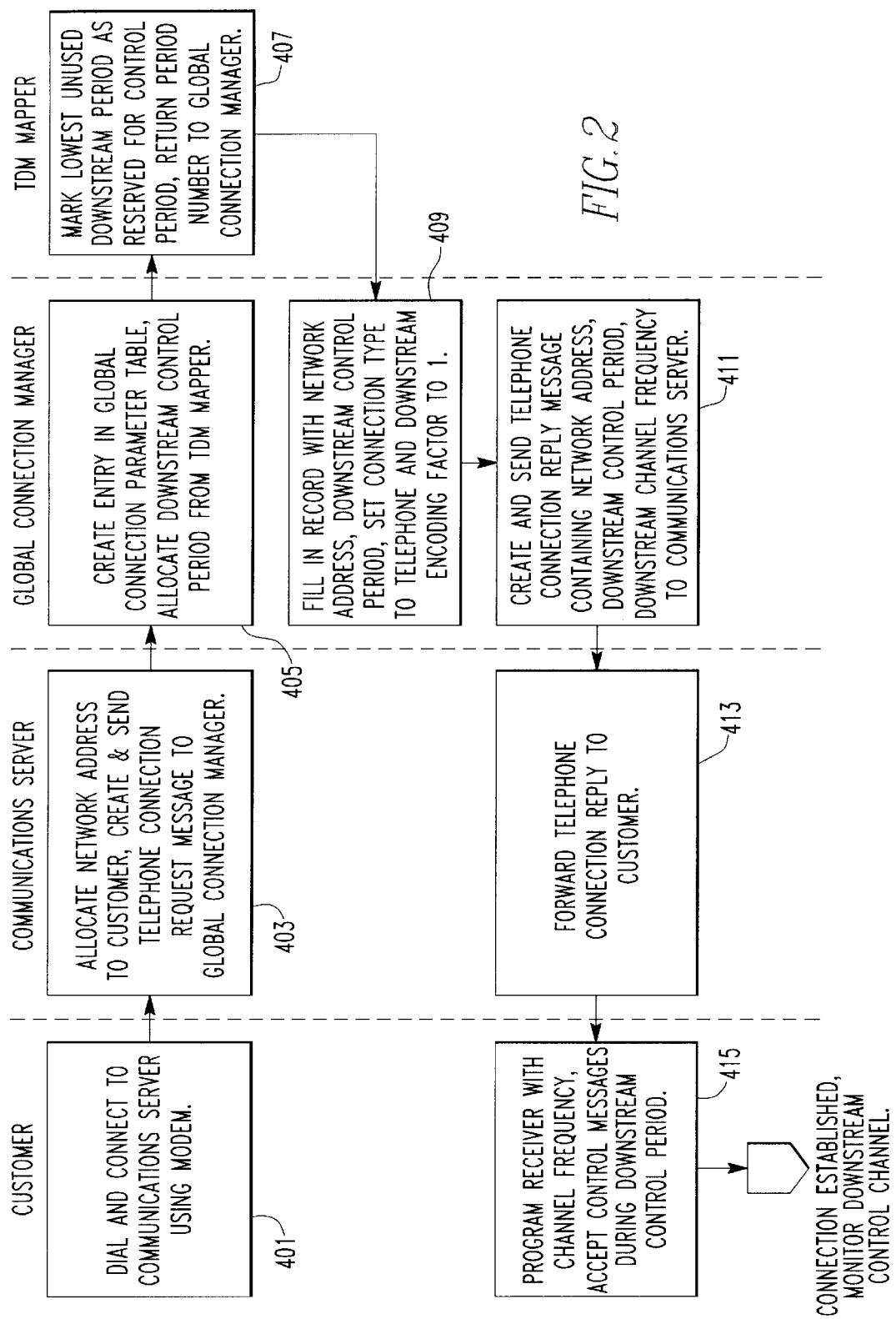
FIG. 2 is a flowchart summarizing the connection process for a user using a telephone upstream path.

Referring to FIG. 2, a flowchart summarizing the connection process for a telephone upstream path is illustrated. The user initiates a connection to the communications server 9 using a conventional telephone modem 8 in step 401. The communications server 9 allocates a network address to the user, which is a common practice for Internet access providers. The communications server 9 creates and forwards a telephone connection request to the global connection manager 11 containing the user identification and network address in step 403.

The global connection manager 11 creates an entry for the new connection in the global connection parameter table, and requests a downstream control period for the user from the TDM mapper 12 in step 405.

In step 407, the TDM mapper 12 marks the lowest unused period in the next frame for use a downstream connection control channel for the user and returns the allocated period number to the global connection manager 11.

The global connection manager 11 places the allocated downstream connection control period into the user's entry in the global connection parameter table 32 then sets the downstream control channel encoding factor and connection type in step 409. A connection reply message is then created at step 411 and forwarded to the communications server 9 containing the network address, the downstream control period and downstream channel frequency.

The communications server 9 then forwards, at step 413, the connection reply message to the user.

The user programs the receiver to the indicated channel frequency, and accepts downstream connection control messages during the specified control period at step 415.

Connection Establishment (Cable/Broadcast Upstream)

Transmission frequencies for upstream and downstream transmission are predetermined. To establish a connection, the user monitors the downstream transmission to determine the frame duration, then selects a random time less than half the frame duration. The user prepares a message containing the random time and a user identifier. The user monitors the downstream transmission for a connection request signal. Upon receiving the signal, the user transmits a connection request upstream through the distribution means to the service node at the random time selected. The TDM mapper 12 decodes and forwards the connection request(s) to the global connection manager 11. The global connection manager 11 allocates periods in the upstream and downstream frames to be used as a control channel by the user, and transmits a connection reply message containing the control channel information during period 0 of a subsequent downstream frame. The user then monitors period zero of each downstream frame for its connection reply.

The global connection manager 11 periodically instructs the TDM mapper 12 to transmit a connection request signal which signals unconnected users to attempt to establish a connection to the service node. During the downstream frame which contains the connection request signal, only unconnected users are permitted to perform upstream transmissions. Also during this frame, the TDM mapper 12 uses a special upstream frame which contains only one upstream period encompassing the duration of the downstream frame, essentially receiving all upstream transmissions in period 0 of the upstream frame.

The TDM mapper 12 transmits a connection request signal by sending a synchronizing pulse for period zero of the downstream frame which is longer in duration than the normal period zero synchronizing pulse. In all other respects the downstream frame is normal and still contains control and data messages for connected users. Upon receiving the connection request signal, users without established connections program their receiver/transmitter 19 to transmit the encoded connection request message at the random time contained within the message, relative to the start of the current downstream frame containing the connection request signal.

The TDM mapper 12 receives the corresponding upstream transmissions in the upstream frame. At the conclusion of the frame it extracts the received messages, calculates and appends the round trip time between the service node and the user, and places the appended message on a receive queue for period 0. Invalid or corrupted connection request messages are discarded. The round trip time is calculated by subtracting the randomly selected transmission start time contained in the connection request message from the arrival time of a connection request message relative to the start of the upstream frame in which it is received.

Upon the conclusion of the downstream frame containing the connection request signal, the local connection manager 22 for each unconnected user programs their receiver/transmitter 19 to accept data during period 0 of each downstream frame which follows.

The global connection manager 11 sequentially removes the appended connection request messages from the receive queue for period 0 and creates a record for each new connection in the connection parameters table. The global connection manager 11 allocates a currently unused downstream period via the TDM mapper 12 for the downstream control period, allocates a currently unused upstream period via the TDM mapper 12 for the upstream control period, sets the downstream and upstream encoding factors to 1, and sets the round trip delay time to the value contained in the appended connection request message. The global connection manager 11 then prepares a connection reply message for each new connection containing the downstream control period, the upstream control period transmission start time, and the upstream transmission duration for the upstream control period. The upstream control transmission start time is calculated by subtracting the round trip delay time from the start time of the upstream control period relative to the start of the downstream frame. The global connection manager 11 then encodes the connection reply message with an encoding factor of 1 and places the encoded message into a transmit queue for period 0 in the TDM mapper.

The TDM mapper 12 removes one connection reply message from the period 0 transmit queue for each downstream frame and transmits the message during period 0 of the downstream frame.

The customer premises equipment 2, which is monitoring period 0 of each downstream frame, waits for a connection reply message to be received which contains the randomly selected transmit time number which the user previously sent in its connection request message. If none is received prior to the occurrence of the next connection request signal, the connection bid was lost due to either transmission error or collision and the local connection manager 22 must repeat the entire connection request process. If the correct connection reply is received, the local connection manager 22 places the information contained in the connection reply message into its connection parameter table 33.

Figure 3:
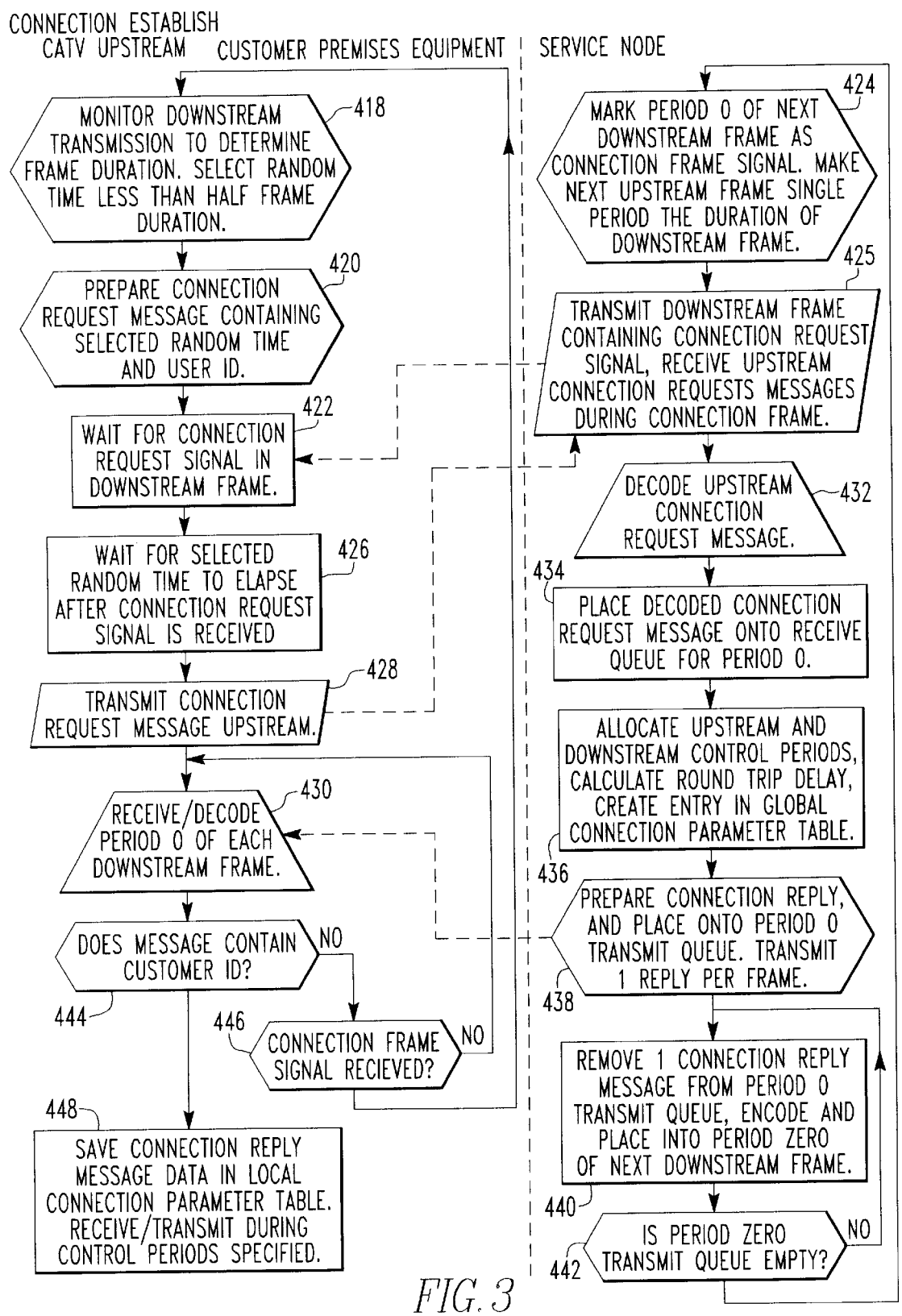
FIG. 3 is a flowchart summarizing the connection process for a user using a CATV upstream path.

Referring to FIG. 3, a summary of the connection establishment process for a CATV upstream path is illustrated. The user's local connection manager 22 monitors the downstream transmission to determine the downstream frame duration, then selects a random time between 0 and half the downstream frame duration at step 418. The user then prepares a connection request message at step 420 containing the random time and user identifier. The local connection manager 22 waits for a downstream frame containing a connection frame signal to be received at step 422.

Subsequently, the TDM mapper 12 in the service node has marked period zero of a downstream frame as a connection request signal, and created an upstream frame which consists of a single period (period 0) encompassing the entire duration of the downstream frame. That is shown in step 424. The downstream frame containing the connection request signal is transmitted at step 425.

Upon receiving the connection request signal, the local connection manager 22 of the customer premises equipment waits the selected random time at step 426, transmits the connection request through the upstream path at step 428, then proceeds to step 430 where it monitors period zero of each downstream frame for a connection reply message containing the user ID.

The service node receives the connection request message sent by the user during the upstream frame which parallels the downstream frame containing the connection request signal at step 425.

The TDM mapper 12 decodes the connection request messages received during the connection frame at step 432 and places the messages in step 434 onto the receive queue for period 0.

The global connection manager 11 removes each request, allocates a downstream control period, allocates an upstream control period, calculates the round trip delay time between the service node and the user, and creates an entry for the user in the global connection parameter table 32 at step 436. The global connection manager 11 then prepares a connection reply message containing the connection information and places the message into the transmit queue for period 0 at step 438.

During each subsequent downstream frame, the TDM mapper 12 removes a single connection reply message from the transmit queue for period 0, encodes the message and transmits the message during period 0 of the downstream frame as shown at step 440. That process is repeated until the period 0 transmit queue is empty as shown by the decision step 442.

The user listens and decodes the information at period zero of each downstream frame at step 430 and evaluates the decoded information for its customer ID at step 444 and for a connection frame signal at step 446. If another connection request signal is received prior the connection reply being received, the connection request is presumed lost or garbled in the upstream path, and the user restarts the connection process by returning to step 418. If the proper information is received, the information is saved and the user premises equipment is programmed accordingly at step 448.

TDM Mapper Operation (Downstream Transmissions)

The TDM mapper 12 is responsible for time division multiplexing of control messages and data messages for a plurality of users in both the downstream and upstream paths. The TDM mapper 12 is responsible for queuing downstream connection control and data messages for transmission to users and queuing upstream connection control and data messages received from users via the upstream path in the distribution means 18. The TDM mapper 12 maintains a transmit (downstream) and receive (upstream) queue for connection via global connection parameter table 32. The TDM mapper 12 reserves downstream data bandwidth for a user when its transmit queue contains data by sending a connection control message through the control channel to the user that indicates which periods of the next frame contain downstream data messages for the user. The TDM mapper 12 also maintains transmission frames for both downstream (transmit frame 15) and upstream (receive frame 27) transmissions. Each such frame consists of two directly related parts, a control table and a data area. The control table describes the contents of the data area, while the data area contains formatted connection control and data messages.

TABLE 9

Downstream Frame Control Table

| Period Number | Usage R = Reserved, C = Control, D = Data, F = Free | Owner | Sync Pulse Type FS = Frame Start, CFS = Conn. Frame, PS = Period Sep. | Data Area Starting Offset | Data Period Duration | Encoding Format |
|---|---|---|---|---|---|---|
| 0 | R | 0 | FS | 0 | 50 | 1 |
| 1 | C | 2 | PS | 50 | 50 | 1 |
| 2 | F | 0 | PS | 100 | 50 | 1 |
| ... | | | | | | |
| 5 | C | 1 | PS | 250 | 50 | 1 |

TABLE 9-continued

Downstream Frame Control Table

| Period Number | Usage<br>R = Reserved,<br>C = Control,<br>D = Data,<br>F = Free | Owner | Sync Pulse Type<br>FS = Frame Start,<br>CFS = Conn. Frame,<br>PS = Period Sep. | Data Area Starting Offset | Data Period Duration | Encoding Format |
|---|---|---|---|---|---|---|
| ... | | | | | | |
| 11 | C | 4 | PS | 550 | 50 | 1 |
| ... | | | | | | |
| 15 | C | 3 | PS | 750 | 50 | 1 |
| ... | | | | | | |
| 18 | C | 90 | PS | 900 | 50 | 1 |
| ... | | | | | | |
| 499 | F | 0 | PS | 24950 | 50 | 4 |

Referring to the Table 9, the downstream frame control table, the period number is the zero based period number within the downstream frame which the entry describes. The usage refers to how the period is utilized, where reserved is not available for any use, control is used for connection control messages, data is used for data messages, and free is available allocation for either control or data messages. The owner is a reference to a connection number within the connection parameters table 32 within the global connection manager 11. The sync pulse type specifies the type of synchronization pulse for the period as frame start which indicates the period zero of a frame, period separator which divided periods within a frame, or connection frame which is a new connection frame signal. The data area starting offset is the offset into the corresponding data area for the frame where encoded data is to be taken from and transmitted during the period. The data period duration is the duration of the data portion of the period. The encoding factor is the method by which the transmission is to be coded.

The TDM mapper 12 sends the downstream frame control table and corresponding data area to the transmitter/receiver 16 for transmission via the distribution means 18.

The TDM mapper 12 always maintains at least three downstream frames, one which is currently transmitting (T0), and the next two frames to be transmitted (T1 and T2). Only the usage, owner and encoding factor fields of the downstream frame control table change from frame to frame as the TDM mapper allocates and frees periods for downstream data messages to a user. The one exception to this is a new connection frame where the synchronization pulse type for period zero is changed to a connection frame type for a single frame.

When a new connection is being created, the global connection manager 11 will request a period to be reserved within the downstream frame for a downstream connection control period. The TDM mapper 12 responds by selecting the lowest free period in frame T1, marks the period usage as control, and sets the owner field of the period to the entry number representing the connection in the connection parameter table 32 of the global connection manager 11. The period is then reserved for use solely by that connection in every downstream frame until released by the global connection manager 11. A downstream connection control message is created by the TDM mapper 12 for the connection and placed into the corresponding data area of the frame.

Each control period in a frame references a downstream connection control message in the corresponding data area of the frame. The connection control message in turn references downstream data periods which are allocated in the next frame.

The TDM 12 mapper prepares the next frame for transmission while the current frame is being transmitted. The frame control table for T0 is duplicated creating the frame control table for T1. The downstream connection control message for each control period in T0 is also replicated and placed into the corresponding data area of frame T1. The downstream data period start and downstream data period count fields of each replicated downstream connection control message in T1 are reset to indicate no periods are allocated for data messages. Concurrently a list of all periods which are not marked for usage, reserved or control are placed into a list of free periods. The usage for each period in frame T2 contained in the list of free periods is marked as free.

For each control period in frame Ti, the queue associated with the connection is inspected. If the queue contains a downstream connection control message, it replaces the downstream connection control message in frame T1. This allows the global connection manager 11 to issue control changes such as changing the downstream or upstream encoding factors, request replies to downstream connection control messages or update upstream period allocations in a synchronous manner by simply queuing a request.

If the queue for a connection has data messages to transmit downstream to the user, the TDM mapper 12 calculates the number of periods required to transmit the data messages. The TDM mapper then removes up to the calculated number of contiguous periods from the free period list and marks each of the selected periods as a data period owned by the connection in the control table for frame T2. The downstream data period start and downstream data period count fields of downstream connection control message for the connection, contained in frame T1, are modified to indicate the starting period and number of periods for the data transfer. The data is then removed from the queue, encoded and placed into the allocated data area in frame T2.

Once the transmission of the current frame, T0, is completed, frame T1 becomes T0, T2 becomes T1, and the transmitter begins sending the new frame T0.

TDM Mapper Operation (Upstream Transmissions)

The TDM mapper 12 allocates periods of the upstream transmission for data transfer when requested by the global connection manager. The global connection manager is advised of this need by an upstream connection control message sent by the user through the upstream control channel. The upstream data periods remain allocated until released by the global connection manager.

Similar to downstream frames, the TDM mapper maintains three upstream frames to receive upstream transmissions from users. R0 is the frame currently being received; R1 and R2 are the next frames to be received, respectively. Downstream frame T0 and upstream frame R0 encompass identical times, as do T1–R1 and T2–R2. Each upstream frame consists of two directly related parts, a control table and a data area. The control table describes the contents of the data area, while the data area contains formatted upstream connection control and data messages.

12 responds by selecting a block of free periods in upstream frame R2, setting the usage field of each period to data, setting the owner field to that of the connection and setting the encoding factor for each period to that indicated in the connection parameter table 32 for the connection. The TDM mapper 12 then calculates the transmission start time for the newly allocated periods by subtracting a round trip delay time for the connection from the start time of the allocated periods relative to the start of the upstream frame. The upstream transmission duration is then calculated by summing the period duration for the newly allocated upstream periods. The downstream connection control message for the connection in downstream frame Ti is then modified,

TABLE 10

Upstream Frame Control Table

| Period Number | Usage<br>R = Reserved,<br>C = Control,<br>D = Data,<br>F = Free | Owner | Data<br>Area<br>Starting<br>Offset | Data<br>Period Duration | Encoding Factor |
| --- | --- | --- | --- | --- | --- |
| 0 | R | 0 | 0 | 50 | 1 |
| ... | | | | | |
| 9 | C | 0 | 450 | 50 | 1 |
| ... | | | | | |
| 18 | C | 1 | 900 | 50 | 1 |
| ... | | | | | |
| 52 | C | 4 | 2600 | 50 | 1 |
| ... | | | | | |
| 499 | C | 3 | 24950 | 50 | 1 |

Referring to Table 10, the upstream frame control table, the period number specifies the period number within the control table. The usage is how the period is utilized, where reserved is not available for any use, control is used for connection control messages, data is used for data messages, and free is available allocation for either control or data messages. The owner is a reference to a connection number within the connection parameters table 32 within the global connection manager 11. The data area starting offset is the offset into the corresponding data area for the frame where encoded data is to be placed while receiving during the period. The data period duration is the duration of the data portion of the period. The encoding factor is method by which the received transmission is to be decoded.

The TDM mapper 12 passes a downstream and upstream frame to the transmitter/receiver 16 simultaneously. The transmitter/receiver 16 transmits the downstream frame, and places received amplitude data into the data area of the upstream frame according to the period in which it was received. Upon the completion of the frames, the TDM mapper 12 decodes the messages contained in the data area using the encoding factor for the period and places those messages into the receive queue associated with the connection which is specified in the owner field for that period in the upstream frame control table.

Unlike the downstream frame, in which the TDM mapper 12 allocates periods for downstream data transmission without the intervention of the global connection manager 11, upstream data periods are allocated to a connection through the global connection manager 11. Upon receiving an upstream connection control message, the global connection manager 11 requests a number of free periods in the upstream frame from the TDM mapper based on the number of bytes specified in the upstream data to transmit a field of the upstream connection control message. The TDM mapper setting the upstream data period start field and upstream data period duration to the calculated transmission start time and transmission time value, respectively.

Periods of upstream data transmission time remain allocated to a connection until released by the global connection manager 11. This is typically done once the user has no more data to send upstream, as indicated by an upstream connection control message in which the upstream data to transmit field is zero. The global connection manager 11 then indicates to the TDM mapper 12 that any upstream data periods for the connection are to be released. The TDM mapper 12 responds by setting the usage of any upstream periods allocated to the connection in upstream R2 to a free value. The TDM mapper 12 then sets the upstream data period start field and upstream data period duration to zero in the downstream connection control message contained in frame T1.

Transmission Signal Format

The transmission signal format consists of a collection of discrete transmission periods which are contained within a frame. Each period begins with a synchronizing pulse which denotes the start of a transmission period. Immediately following the synchronizing pulse is a reference oscillator burst which is used to synchronize the receiver with the transmitter and to establish a zero level reference signal. The zero level reference is used to set the receiver level for a zero value amplitude code. Following the oscillator burst is a full scale reference signal used to set the receiver level for a full scale amplitude code. Following the full scale reference signal is sequence of encoded message amplitude values.

Figure 4:
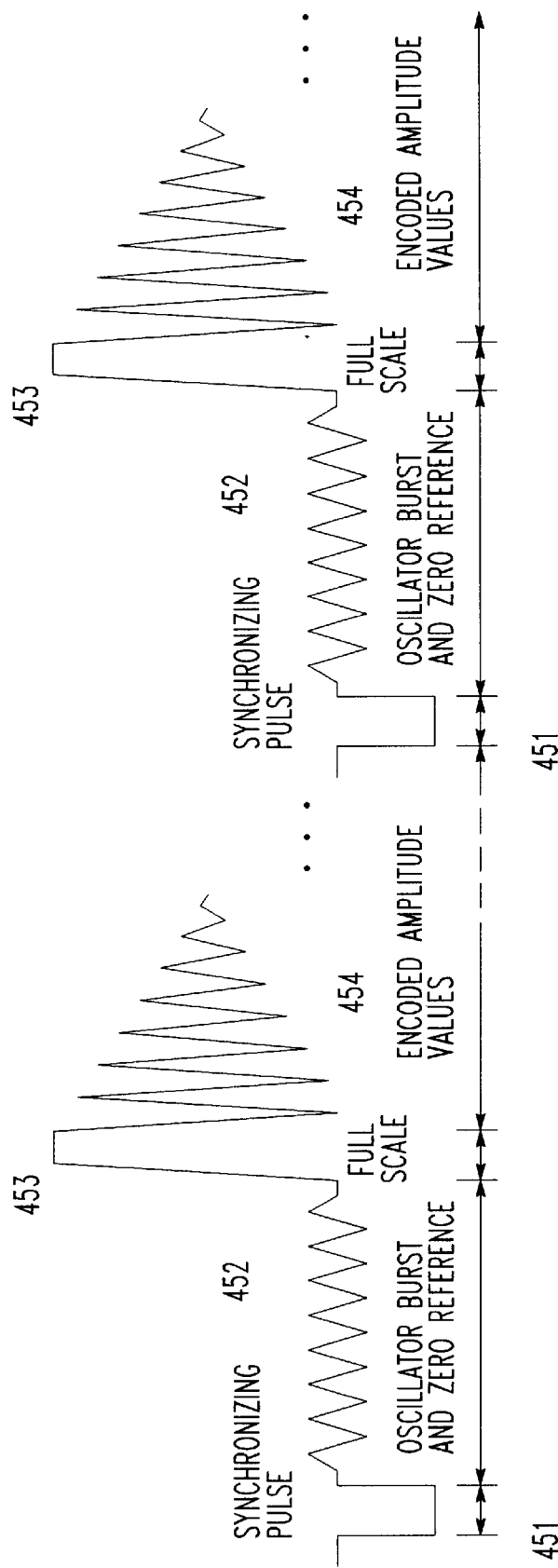
FIG. 4 illustrates the transmission signal format which is comprised of a collection of discrete transmission periods within a frame.

Referring to FIG. 4, each transmitted period of a frame consists of a synchronizing pulse 451 of a duration indicated by the synchronization pulse type, an oscillator burst 452, a full-scale burst 453 and a sequence of N-bit coded amplitudes 454. The transmission format is similar to a conventional NTSC or PAL color broadcast except that the synchronizing pulses, analogous to a horizontal blanking period, have three distinct durations as described previously in the downstream frame format description. The oscillator burst 452 consists of 8 cycles of one half the sample frequency superimposed on a reference zero amplitude level. The full-scale burst 453 consists of one period of the burst oscillator frequency transmitted at the maximum reference level. The sequence of encoded amplitudes 454 occurs at the rate of twice the frequency of the oscillator burst.

Note that in the preferred embodiment the RF signal is amplitude modulated. The transmission format may also include a frequency or phase modulated RF signal. Amplitude modulation was selected for spectral efficiency. Also note that FIG. 4 depicts an inverted composite video baseband signal in which the lowest amplitude point shown, the synchronizing pulse, is the highest RF carrier modulation transmitted (also referred to as "downward modulation").

Service Node Transmitter/Receiver Operation

The transmitter/receiver 16 in the service node 1 contains a modulator 17 and demodulator 26 which generate and receive, respectively, the described transmission signal format. The modulator 17 combines downstream frame control table information, reference levels, and encoded message amplitudes into a format suitable for RF modulation and transmission through the distribution means 18. The demodulator 26 digitizes the upstream signal received through the distribution means 18 and places the received encoded amplitude values into a corresponding receive frame 27.

Figure 5:
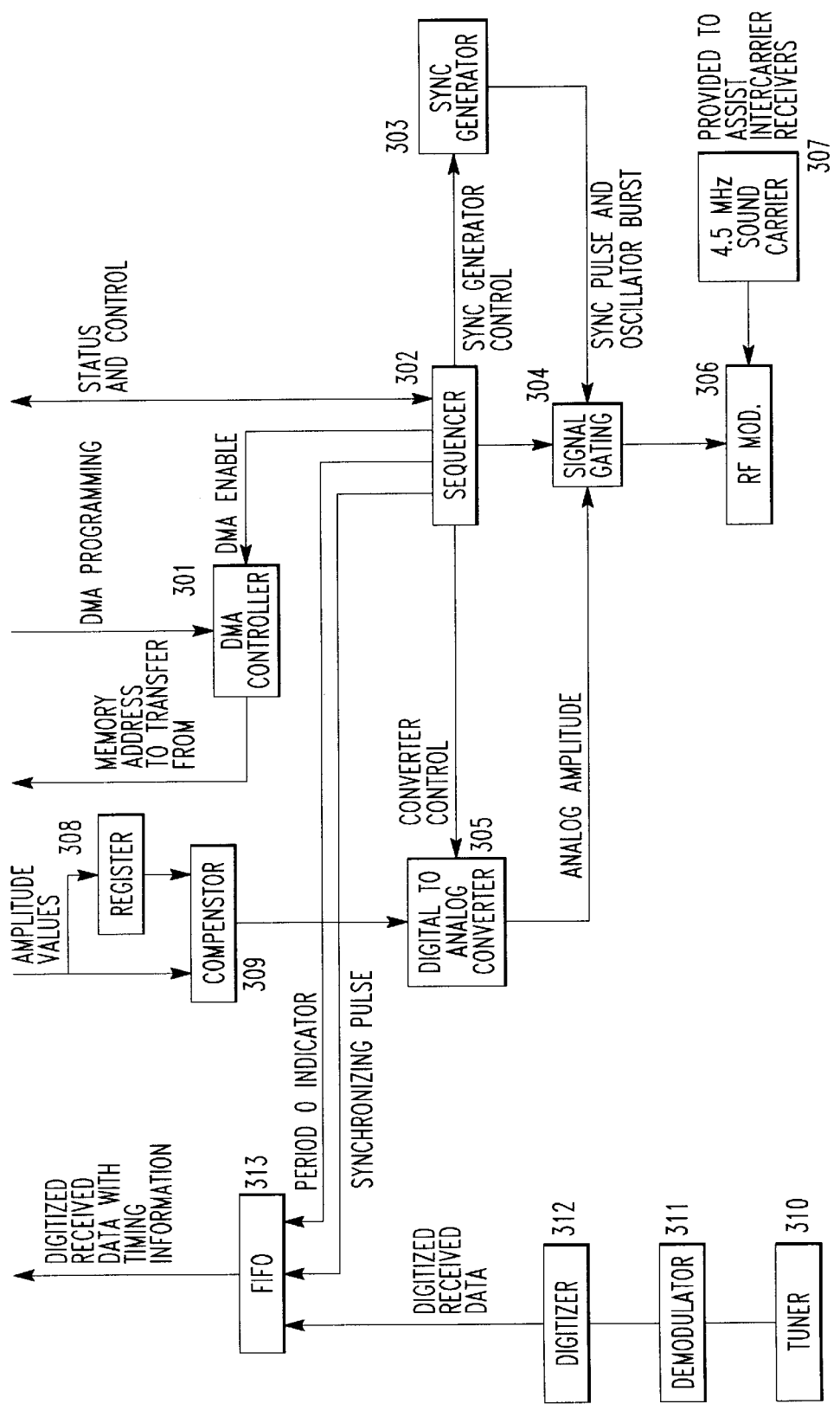
FIG. 5 is a block diagram of an example of a service node transmitter/receiver.

Referring to FIG. 5, an example of a service node transmitter/receiver 16 is depicted. The transmitter/receiver 16 outputs a signal as depicted in FIG. 4. The transmitter/receiver 16 consists of a DMA controller 301, sequencer 302, sync generator 303, signal gating logic 304, digital to analog converter 305, compensator 309 and register 308. RF modulator 306 and sound carrier generator 307 are depicted but are usually separate from the other elements.

Sequencer 302 accepts downstream frame control table data from the TDM mapper 12 which describes the sync pulse type and the number of encoded amplitude values to be output during the period. DMA controller accepts a memory address of the data area of the downstream frame from which the amplitude values for the period are to be transferred. The sequencer 302 uses the sync pulse type data to gate a synchronizing pulse 451 from sync generator 303 through signal gating circuit 304 to the RF modulator 306 for the sync pulse period duration, output an oscillator burst 452 superimposed on a zero reference level, then output a full scale amplitude 453 for one period of the oscillator burst frequency. Next the sequencer 302 disables the gating of synchronizing information from sync generator 303 through signal gating circuit 304 and instructs the DMA controller 301 to begin transferring encoded amplitude data from the data area of the downstream frame from memory to the compensator 309 and register 308. The sequencer enables the output of digital to analog converter 305 through signal gating circuit 304 to the modulator 306.

Compensator 309 and register 308 form an amplitude correction system where the previous amplitude value stored in register 308 and the current amplitude value are fed as address information to a compensator ROM or RAM. The compensator 309 contains data empirically collected concerning the combined average response characteristics of the RF modulator 306 transmission means 18 and user receivers. The actual output amplitude value is adjusted to provide a compensated amplitude which corrects for non-linearity in the RF modulator 306, transmission medium 18 and user receivers. For example, a transition between zero and full scale D/A output may require a slightly over-shooting or under-shooting amplitude to be transmitted which compensates for impulse response non-linearity in the path to the user. These correction are obtained empirically through the transmission of diagnostic messages between the service node and users, in which the full resolution of the received value is echoed back and compared with the known transmitted value. By comparing known transmitted amplitudes, with the returned received amplitude values, a deviation value may be derived for each possible amplitude transition combination. The deviation information is averaged for all users, resulting in a compensation data set, which is updated to the compensator 309. Obviously, if compensator 309 is RAM based, these corrections may be updated more often, even on a continuous basis. In cases of extreme variability amongst diverse users, an individualize adjustment may be integrated into the encoder 13 of the TDM mapper 12.

An alternative modulator means may also consist of an arbitrary waveform generator which accepts a continuous amplitude sample feed at twice the oscillator burst frequency. In this usage, the amplitude data for each period is preceded by additional amplitude values corresponding to the sync pulse, oscillator burst and full scale portions of the period.

Referring to FIG. 5, upstream transmissions are received from users via tuner 310, demodulator 311, digitizer 312 and FIFO buffer 313. Tuner 310 is programmed the receive the shared bandwidth upstream channel. Demodulator 311 recovers the amplitude level from the received signal. Digitizer 312 converts the amplitude to a digital value proportional to the zero and full scale amplitude of the demodulated signal. FIFO buffer 313 queues the digitized amplitude and combines a period zero and synchronizing pulse indicator to aid in the recovery of time domain information. By knowing the sample rate of digitizer 312, the time of occurrence of a particular received sample may be calculated from its position relative to period zero in the output stream from FIFO buffer 313. This is used to establish the round trip delay time for received connection requests.

Customer Premises Equipment Receiver/Transmitter Operation

The customer premises equipment receiver/transmitter 19 contains a demodulator 20 and modulator 25 which receive and generate, respectively, the described transmission signal format. The modulator combines a sync pulse, reference levels, and encoded message amplitudes into a format suitable for RF modulation and transmission upstream through the distribution means 18. The digitizer 21 digitizes the downstream signal received from the demodulator 20 through the distribution means 18 and places the received decoded amplitude values into a receive buffer for decoding by the local connection manager 22.

Figure 6:
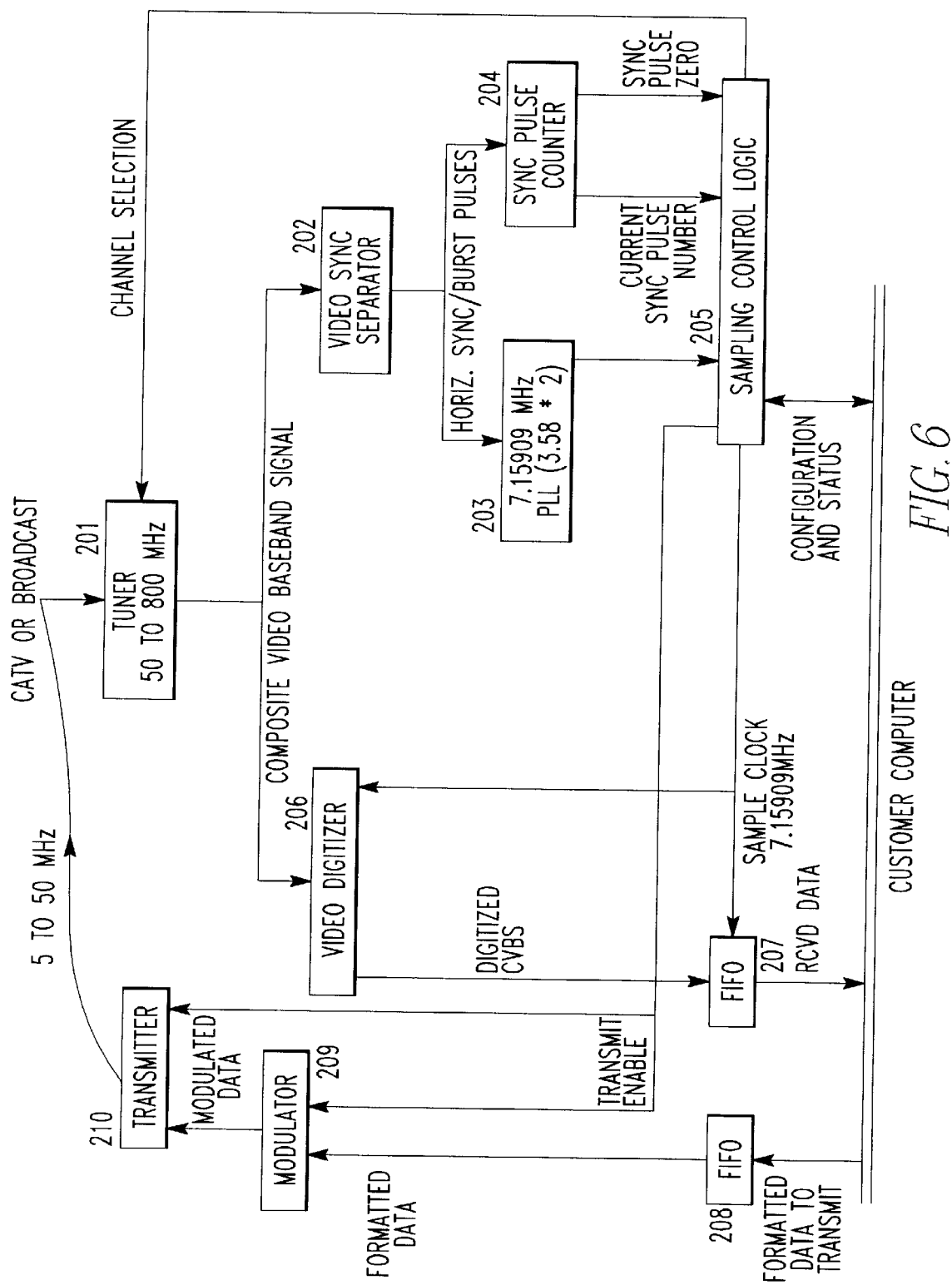
FIG. 6 is a block diagram of an example of customer premises equipment.

Referring to FIG. 6, a detail of the customer premises equipment 2 is illustrated. A tuner 201 receives the downstream signal provided by the downstream modulator 17 in FIG. 1. The tuner outputs a composite video baseband signal (CVBS) which is fed to a video sync separator 202 and a video digitizer 206. The video sync separator 202 extracts the synchronizing pulse from each received period, and generates an oscillator burst pulse triggered by the trailing edge of the synchronizing pulse. During the oscillator burst pulse, a phase lock loop (PLL) 203 operating at twice the frequency of the oscillator burst, is synchronized to the incoming oscillator burst. A sync pulse counter 204 differentiates synchronizing pulse widths and counts synchronizing pulse occurrences and measures the time relative to the arrival of a frame start pulse. A medium length pulse, denoting the start of a downstream frame, resets the sync pulse counter 204 and a time counter. A short synchronizing pulse, denoting the separation between periods within a frame, causes the sync pulse counter 204 to increment by one for each short pulse occurrence.

Sampling control logic 205 instructs the digitizer 206 to calibrate to the zero and full scale reference portion of each received period.

Upon receiving the synchronizing pulse for the period of a downstream frame allocated to the user for control or data transmission, as counted by sync pulse counter 204, the sampling control logic 205 enables the video digitizer 206 to sample and transfer the digitized amplitude of the CVBS signal into a FIFO memory 207. The digitizer 206 outputs a digital code representing the amplitude level relative to the zero and full scale levels. Ideally, the digitizer 206 will output the same amplitude code as was transmitted. The PLL 203 provides a sample clock, gated through the sampling control logic 205, which causes the digitizer 206 to sample the CVBS signal in quadrature to the phase lock loop. CVBS amplitude samples are collected for the period(s) allocated to the user.

Upon the arrival of the upstream transmission time as measured by sync pulse counter 204, the sampling control logic 205 enables transmitter 210 and modulator 209 to begin transmitting. Encoded upstream message amplitude codes are transferred from FIFO memory 208 to modulator 209 which generates a signal similar to that depicted in FIG. 4.

Local Connection Manager Operation

The local connection manager 22 for each user is responsible for programming the receiver/transmitter hardware 19, encoding and decoding messages and maintaining the operation of the connection between the user and service node. It constantly monitors and acts on the downstream connection control message it receives in each downstream frame.

The local connection manager 22 receives, decodes and acts on downstream connection control messages, and creates, encodes and transmits upstream control messages.

Each downstream connection control message received by the local connection manager 22 specifies during which period and in what format data messages will be received or transmitted by the user during the next frame.

Upstream data messages initiated by the browser 5 are placed onto the protocol stack 6 and transferred through the splitting router 7 to the local connection manager 22. The local connection manager 22 indicates the volume of upstream data to transmit through an upstream connection control message sent to the global connection manager 11 in the service node 1. The global connection manager 11 will allocate upstream data periods to the connection, and notify the local connection manager 22 in a subsequent downstream connection control message.

Downstream data messages are received by the local connection manager 22, decoded, and transferred through the splitting router 7 to the protocol stack 6. The user browser 5 later removes the messages from the protocol stack 6.

Figure 7:
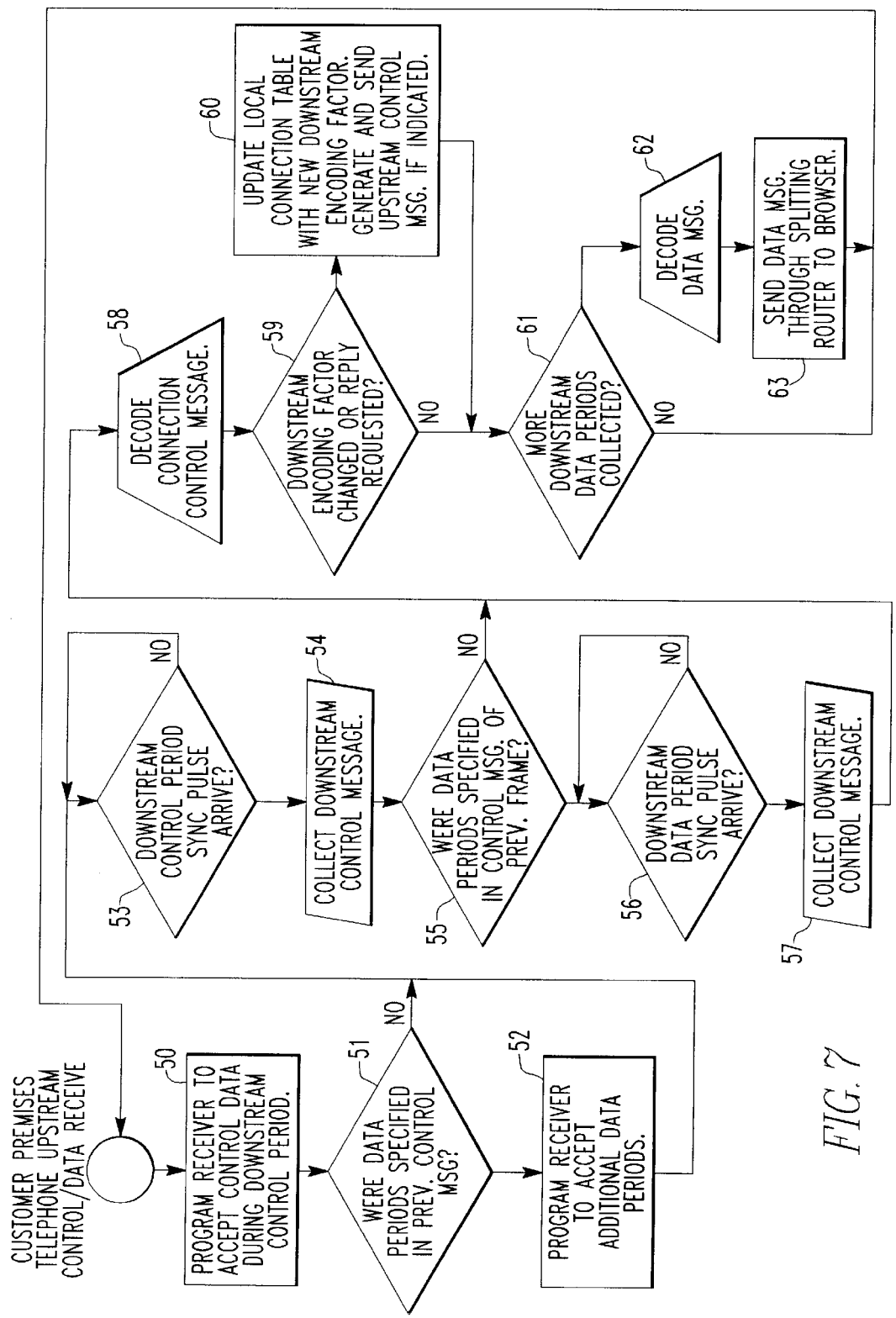
FIG. 7 is a flowchart depicting downstream message handling by the local connection manager.

Referring to FIG. 7, a flowchart depicting downstream message handling by the local connection manager 22 is shown. The local connection manager 22 programs the receiver/transmitter 19 to accept downstream connection control messages during the downstream control period assigned and to accept data messages during the periods indicated by the previously received downstream connection control message at steps 50, 51, and 52. The receiver/transmitter 19 awaits the occurrence of the downstream control period in the next frame as shown by decision step 53, then proceeds to collect the amplitude data for the control period at step 54. Next the receiver/transmitter 19 awaits the occurrence of the specified downstream data period(s), if any, as shown by decision steps 55, 56, then proceeds to collect the amplitude data for the data period(s). The downstream connection control message is decoded using an encoding factor of 1 at step 58. If the downstream connection control message indicated a reply was needed, the local connection manager 22 prepares and sends an upstream connection control message via modem 8 or using the local receiver/transmitter 19 as shown by steps 59, 60.

If downstream data periods were specified and received, the received encoded data messages are decoded using the encoding factor contained in the downstream connection control message received during the previous frame. The decoded data messages are relayed through the splitting router to the user browser completing the downstream message cycle as shown by steps 61, 62, and 63.

Figure 8:
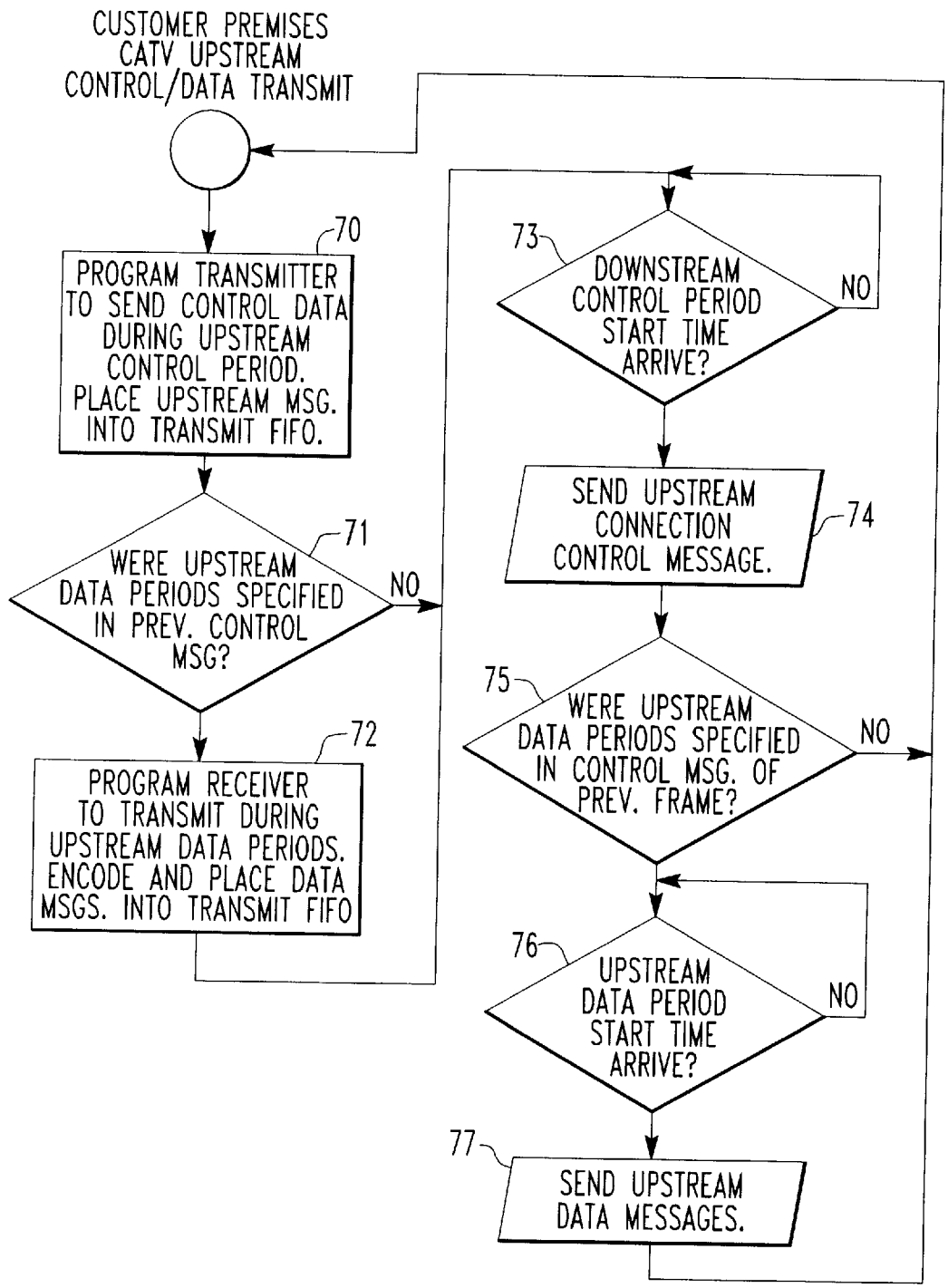
FIG. 8 is a flowchart depicting CATV upstream message handling by the local connection manager.

Referring to FIG. 8, a flowchart depicting CATV upstream message handling by the local connection manager 22 is shown. The local connection manager 22 programs the receiver/transmitter 19 to transmit an upstream connection control messages during the upstream control period assigned, then encodes and transfers the message to the FIFO memory 208 (FIG. 6) at step 70. If upstream data periods were indicated by the previously received downstream connection control message, the local connection manager programs the receiver/transmitter 19 to transmit upstream data messages during the period(s) indicated, then encodes and transfers the data messages into the transmitter FIFO memory 208 as shown by steps 71 and 72. The receiver/transmitter 19 awaits the occurrence of the upstream control period in the next frame as shown by decision step 73, then proceeds to transmit the encoded upstream connection control message 74. Next the receiver/transmitter 19 awaits the occurrence of the specified upstream data periods, if any, as shown by decision steps 75 and 76 then proceeds to transmit the encoded upstream data messages at step 77.

If downstream data periods were specified and received, the received encoded data messages are decoded using the encoding factor contained in the downstream connection control message received during the previous frame. The decoded data messages are relayed through the splitting router 7 to the user browser 5, completing the downstream message cycle.

Referring to Table 11, the local connection manager 22 for each user maintains a table describing the parameters for the connection to the service node.

TABLE 11

| Connection Parameter Table (Customer Premises Equipment) | | |
| --- | --- | --- |
| Downstream Control Period | Upstream Control Period Transmission Start Time | Upstream Transmission Control Period Duration |

The downstream control period is the period in each downstream frame allocated to the user for receipt of downstream connection control messages. The upstream control period transmission start time is the starting time in each upstream frame, relative to the reception of a frame start synchronizing pulse in the downstream transmission, when the user is to transmit upstream connection control messages. The upstream transmission control period duration is the amount of time allocated to the user, in each upstream frame, for the transmission of upstream connection control message.

The local connection manager 22 accepts the encoded downstream amplitude values from digitizer 21. Control and data messages are differentiated by the downstream period in which they are received.

Downstream connection control messages are decoded with a encoding factor of 1. The contents of the downstream connection control message are used to program receiver/transmitter 19 with the additional periods of the downstream and/or upstream transmission.

Referring to FIG. 1, decoder 23, decodes the received encoded messages. Messages received during the downstream control period are decoded using a decoding factor of 1. The local connection manager 22 passes data messages through the splitting router 7 to the communications protocol stack 6, then to the browser 5. Control messages, such as those used for allocating additional downstream periods, diagnostic messages and the like are handled internally to the local connection manager 22 and are used to control the actions of the customer premises equipment.

In systems where an upstream path is not provided via the distribution means 18, when a downstream connection control message requires a reply to the service node 1, the local connection manager 22 sends the reply through the splitting router 7 onto the user protocol stack 6. The protocol stack 6 then forwards the reply back through the splitting router 7 to the modem 8 for transmission to the communications server 9 in the service node 1.

While the present invention has been described in conjunction with preferred embodiments thereof, many modifications and variations will be apparent to those of ordinary skill in the art. The foregoing description and the following claims are intended to cover all such modifications and variations.

What is claimed is:

1. A method performed by a source of data for establishing a communication session between the source and one of a plurality of users, said method comprising the steps of:

creating a series of transmission frames each divided into a sequence of transmission frame periods;

transmitting a connection request signal during one of said transmission frame periods;

receiving from a user a connection request message in response to said connection request signal;

allocating a first frame transmission period to the user for connection information and a second frame transmission period to the user for data;

transmitting during a predetermined frame transmission period information unique to the user and the position of said first frame transmission period within said sequence;

transmitting during said first frame transmission period the position of said second frame transmission period within said sequence; and transmitting data during said second frame transmission period.

2. The method of claim 1 wherein said step of allocating said second frame transmission period includes the step of increasing the bandwidth allocated to the user by allocating additional transmission frame periods to the user for data.

3. The method of claim 2 wherein said step of allocating additional transmission frame periods is performed dynamically.

4. The method of claim 1 additionally comprising the steps of encoding the data to be transmitted, and transmitting during said first frame transmission period instructions for decoding the data.

5. The method of claim 4 wherein the manner in which said data is encoded is changed dynamically.

6. The method of claim 1 additionally comprising the steps of creating a series of receive frames, each divided into a sequence of receive frame periods, and wherein said receive frames are of the same duration as said transmission frames;

allocating a first receive frame period to the user for connection information and a second receive frame period to the user for data; and transmitting during said first transmission frame period the position of said first receive frame period and the position of said second receive frame period.

7. The method of claim 1 wherein said step of creating a series of transmission frames includes the step of generating a synchronizing pulse of a first predetermined duration for identifying the beginning of a transmission frame.

8. The method of claim 1 wherein said step of dividing each transmission frame into a sequence of transmission frame periods includes the step of generating a synchronizing pulse of a second predetermined duration for identifying the beginning of each period.

9. A method performed by a user for establishing a communication session between the user and a source of data, said method comprising the steps of:

receiving a connection request signal generated by the source of data;

transmitting a connection request message to the source in response to said connection request signal;

monitoring a predetermined frame transmission period for information unique to the user and the position of a first frame transmission period within a sequence of frame transmission periods allotted to the user for connection information;

receiving during said first frame transmission period the position of a second frame transmission period within said sequence of frame transmission periods allocated to the user for data; and receiving data during said second frame transmission period.

10. A method for establishing a communication session between a source of data and one of a plurality of users, said method comprising the steps of:

the source creating a series of transmission frames each divided into a sequence of transmission frame periods;

the source transmitting a connection request signal during one of said transmission frame periods;

the users receiving said connection request signal;

one of the users transmitting a connection request message in response to said connection request signal;

the source receiving said connection request message;

the source allocating a first frame transmission period to said one of the users for connection information and a second frame transmission period to said one of said users for data;

the source transmitting during a predetermined frame transmission period information unique to said one of the users and the position of said first frame transmission period within said sequence;

said one of the users monitoring said predetermined frame transmission period for said information unique to said one of the users and said position of said first frame transmission period;

the source transmitting during said first frame transmission period the position of said second frame transmission period within said sequence;

said one of the users receiving during said first frame transmission period said position of a second frame transmission period;

the source transmitting data during said second frame transmission period; and said one of the users receiving said data during said second frame transmission period.

11. The method of claim 10 wherein said step of allocating said second frame transmission period includes the step of increasing the bandwidth allocated to said one of the users by allocating additional transmission frame periods to said one of the users for data.

12. The method of claim 11 wherein said step of allocating additional transmission frame periods is performed dynamically.

13. The method of claim 10 additionally comprising the steps of encoding the data to be transmitted, and transmitting during said first frame transmission period instructions for decoding the data.

14. The method of claim 13 wherein the manner in which said data is encoded is changed dynamically.

15. The method of claim 10 additionally comprising the steps of:

the source creating a series of receive frames, each divided into a sequence of receive frame periods, and wherein said receive frames are of the same duration as said transmission frames;

the source allocating a first receive frame period to said one of the users for connection information and a second receive frame period to said one of the users for data; and the source transmitting during said first transmission frame period the position of said first receive frame period and the position of said second receive frame period.

16. The method of claim 10 wherein said step of creating a series of transmission frames includes the step of generating a synchronizing pulse of a first predetermined duration for identifying the beginning of a transmission frame.

17. The method of claim 16 wherein said step of dividing each transmission frame into a sequence of transmission frame periods includes the step of generating a synchronizing pulse of a second predetermined duration for identifying the beginning of each period.

* * * * *